UNITED STATES PATENT OFFICE.

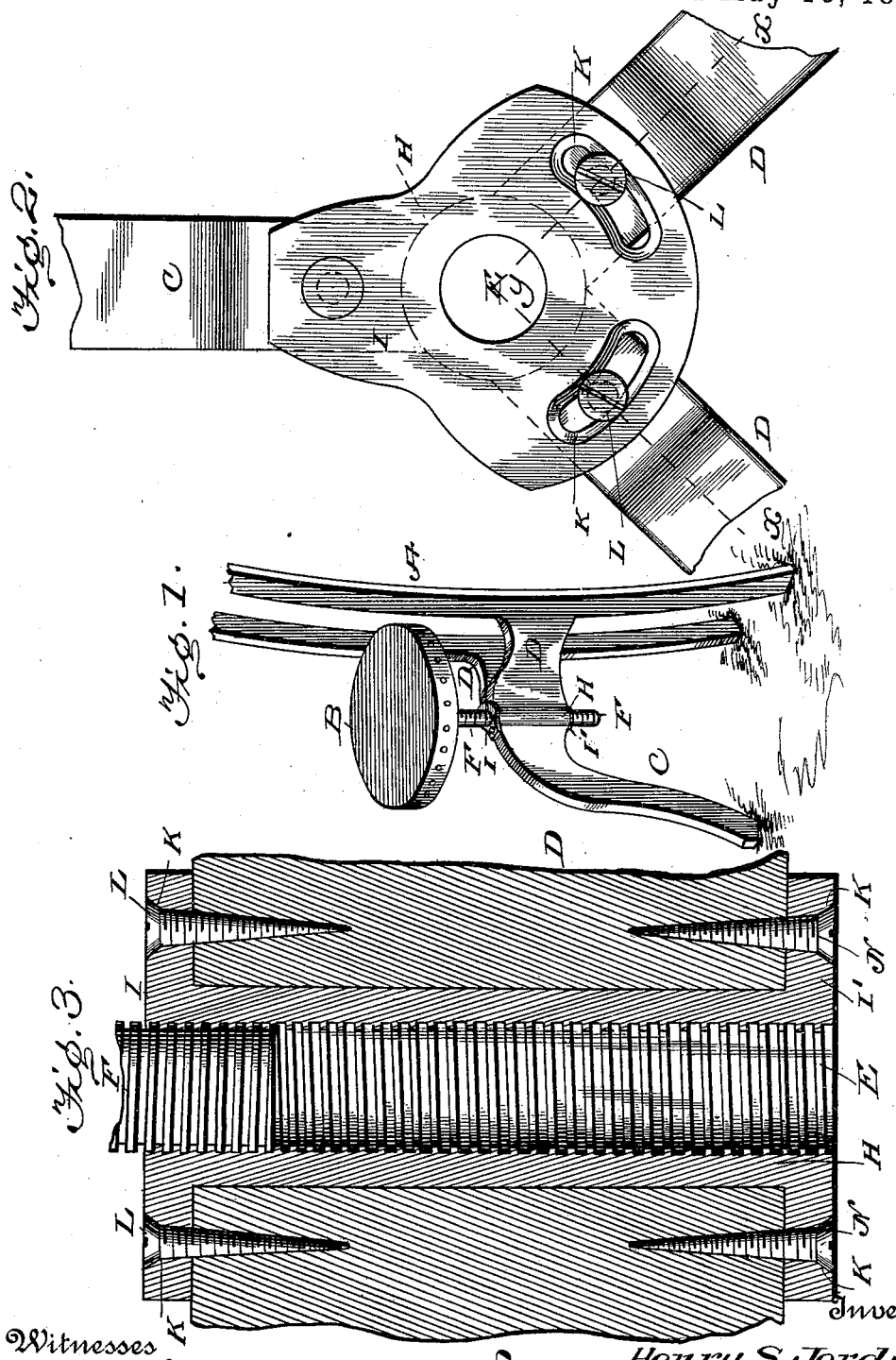

HENRY S. JORDAN, OF GRAND RAPIDS, MICHIGAN.

ADJUSTABLE CHAIR.

SPECIFICATION forming part of Letters Patent No. 582,928, dated May 18, 1897.

Application filed September 17, 1896. Serial No. 606,167. (No model.)

*To all whom it may concern:*

Be it known that I, HENRY S. JORDAN, a citizen of the United States, residing at the city of Grand Rapids, in the county of Kent and State of Michigan, have invented certain new and useful Improvements in Adjustable Chairs, of which the following is a specification.

This invention relates to certain new and useful improvements in adjustable-chair braces; and the invention refers more particularly to a chair constructed with three legs and provided with a vertically-adjustable seat, the objects of the invention being, first, to cheapen the construction of this class of chairs, and, second, to provide means for the ready adjustment of the braces which connect the front leg to the chair-back, whereby the connection or braces may be adjusted so as to vary the angle between them in order to adapt them to chair-backs of different widths. These objects I accomplish by means of the mechanism illustrated in the accompanying drawings, in which—

Figure 1 shows a perspective view of my invention. Fig. 2 shows a plan view of the front leg and back braces with the chair seat and back removed. Fig. 3 shows a sectional view on substantially the line X Y X of Fig. 2.

Similar letters refer to similar parts throughout the several views.

In the drawings, A represents the back of the chair, constructed in any suitable manner and securely attached by means of the leg-braces D D to the front leg by means of the mechanism hereinafter described.

B represents the chair-seat.

C represents the front leg of the chair, the braces D D being connected to the front leg through the nut and flanges with screws or bolts, as hereinafter more fully described.

E represents the opening adapted to receive the pintle or spindle which supports the adjustable seat B.

F represents the seat-spindle, which is provided with a screw-thread passing through the nut H, H being the nut for the spindle and being provided with an internal screw-thread which engages with the screw-thread on the spindle F, thereby enabling the user to raise or lower the seat B at pleasure. The nut H is provided with flanges, one at the top and one at the bottom, the top flange being shown by I and the bottom flange by I'. The top flange is provided with slots, (shown by K K,) and the bottom flange is provided with similar slots. Through these slots are passed bolts or screws, which bolts or screws engage with the braces D D, securely attaching the same to the flanged nut H both at the top and the bottom. The braces D D are securely attached to the back A in any suitable manner. They are shaped so as to fit the nut H, and the screws or bolts L L, passing through these slots K into the braces, make a secure and permanent attachment between the braces and the nut. As hereinbefore stated, the bottom flange of the nut is provided with slots like the slots K K, and through these bottom slots screws N N are passed into the braces from below precisely like the screws L L pass thereinto from above. By this construction the nut H, with its flanges, enables the manufacturer to apply chair-backs of different widths without any alterations in the nut or the flanges to the front leg and seat. The flanges being provided with slots and the bolts passing through the slots allow for the adjustment to the required point, and the tightening up of the screws or bolts makes the attachment secure. This construction is found of great advantage to the manufacturer, for the reason that it saves the nice adjustment which otherwise would be necessary, and it enables the manufacturer to construct chairs having backs of different widths, using at the same time the same nut H, provided with its flanges, and also using the same form of front leg and braces for such purpose.

The nut H has a forward projection, as shown in the drawings, through which and into the front leg C a bolt or other suitable device is passed, whereby said leg is firmly secured to the nut.

Having thus described my invention, what I claim to have invented, and desire to secure by Letters Patent, is—

1. In an adjustable chair, the combination with the back, of a nut having upper and lower flanges provided with slots, braces connected with the back and screws connecting the braces with the nut and passing through the slots in the flanges of said nut, and a front leg secured to said nut, substantially as described.

2. In an adjustable chair, the combination with the back of two braces secured thereto, a nut to which the braces are adjustably connected, a front leg secured to said nut, a spindle having engagement with said nut, and a seat carried by said spindle, substantially as described.

In witness whereof I have hereunto set my hand and seal in the presence of two witnesses.

HENRY S. JORDAN. [L. S.]

Witnesses:
ARTHUR C. DENISON,
CHRISTOPHER HONDELINK.